Figure 1:
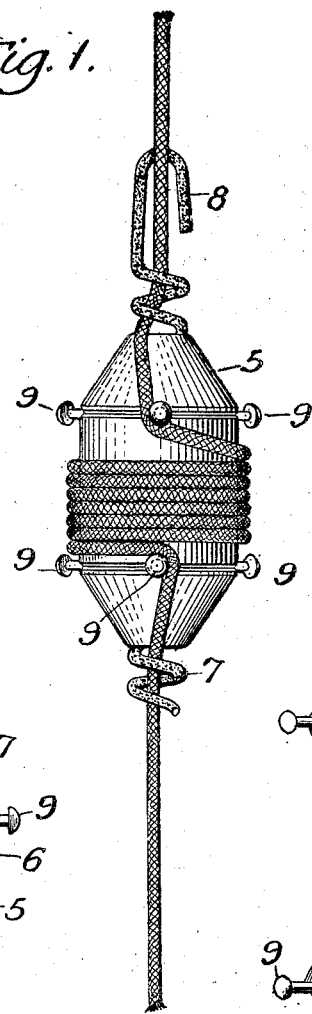

H. VAN ALTENA.
SLACK SPOOL FOR ELECTRIC WIRING.
APPLICATION FILED SEPT. 14, 1909.

963,666.

Patented July 5, 1910.

WITNESSES:
Wm Smith
W. E. Linton

INVENTOR,
Henry Van Altena,
BY Victor J. Evans
ATTORNEY

UNITED STATES PATENT OFFICE.

HENRY VAN ALTENA, OF NEW BRUNSWICK, NEW JERSEY.

SLACK-SPOOL FOR ELECTRIC WIRING.

963,666.  Specification of Letters Patent.  Patented July 5, 1910.

Application filed September 14, 1909. Serial No. 517,649.

*To all whom it may concern:*

Be it known that I, HENRY VAN ALTENA, a citizen of the United States, residing at New Brunswick, in the county of Middlesex and State of New Jersey, have invented new and useful Improvements in Slack-Spools for Electric Wiring, of which the following is a specification.

Figure 2:
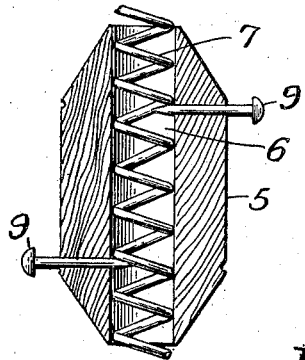
Figure 4:
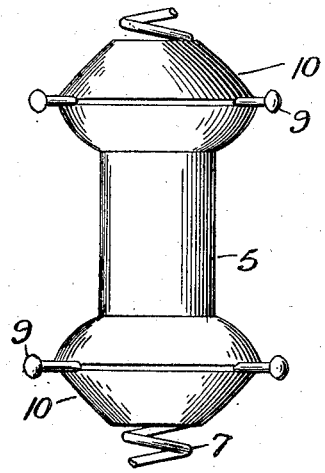
Figure 3:
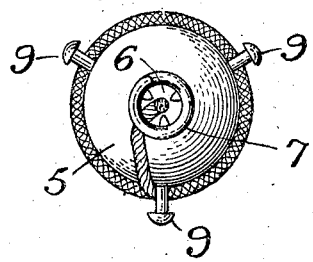

This invention relates to slack spools for electric wiring and is adapted for use in loops for lights or other purposes where it is desired that certain lengths may be provided, and the slack in the loop provided for, as will be more fully described in the following specification, set forth in the claims and illustrated in the drawings, where:

Figure 1 is a side view of the spool showing its use. Fig. 2 is a vertical, sectional view of same. Fig. 3 is a plan view. Fig. 4 is a modified form.

It has been the practice heretofore to provide loops carrying electric light bulbs, and those in use for other purposes, with blocks or balls of non-conductive material having perforations through which the wiring passes so that it may be taken up, leaving the loop of any desired length. In the use of this device, however, a certain amount of slack wire remains which is a serious inconvenience and it is to provide for this slack that this invention is designed.

The spool 5 may be of wood or some non-conductive material and has a passage 6 running through its length to receive the wire coil 7 having at its upper end a hook 8, this wire being coiled to fill the space within the passages and bear against its walls. Near the upper and lower ends of the spool are pins 9 which pass partly through same and into the passage 6 where they prevent the removal of the wire 7.

The slack wire is wound upon the spool as shown in Fig. 1, one end of it passing upward around one of the pins 9 and into the coils of the wire 7. The other end of the circuit wire also passes around a pin and is carried inward toward the center of the spool and passes within the lower end of the coil 7.

It is obvious that any desired amount of slack wire may be wound upon this spool before the ends of the circuit wire is passed around the pins and into the coil.

The hook 8 is used to hang the coil up at any desired point so that the electric lamp may be hung against the wall of the room, but it is optional whether the lights should be allowed to hang from a socket near the center of the room.

In the modified form shown in Fig. 4, the spool is provided with flanges 10 so that a greater amount of wire may be wound or stored thereon and it is obvious that other desired forms may be used without departing from the essential features of the invention as above described.

The hook 8 at the upper end of the coil 7 may be covered with some insulating material such as rubber to prevent short circuiting in the electric wiring.

What I claim as new and desire to secure by Letters Patent is:

1. The combination of a block on which a flexible conductor is adapted to wind, radially-extending members adjacent the ends of the block for engaging the conductor, and axially-extending conductor engaging members at the ends of the block.

2. The combination of a block on which a flexible conductor is adapted to wind, radially-extending members adjacent the ends of the block for engaging the conductor, and axially-extending conductor engaging members at the ends of the block, both of the last-mentioned members being constructed of coiled wire and the upper member being formed with a hook.

3. The combination of a spool having a longitudinal passage, a device extending through the passage and having its ends formed into wire-engaging means, and a wire-engaging device extending from the side of the spool and forming means for holding the first-mentioned device in place.

4. In a slack spool, the combination with a spool having a longitudinal passage, of a wire coil passing through the passage and having insulated hooks at its ends, of radial pins extending into the passage to engage the coil and hold the wiring.

5. The combination of a spool, a series of upper and lower radially-extending members fixed on the spool and spaced apart to permit a wire to be coiled around the spool between the said series whereby any two of the members of both series can form wire-engaging means, and wire-engaging means projecting in opposite directions from the ends of the spool.

In testimony whereof I affix my signature in presence of two witnesses.

HENRY VAN ALTENA.

Witnesses:
JAMES F. DUHAMEL,
DAVID GORDON.